Jan. 25, 1966
G. R. SPETZ
3,230,778
CONTROL APPARATUS
Filed Dec. 28, 1959
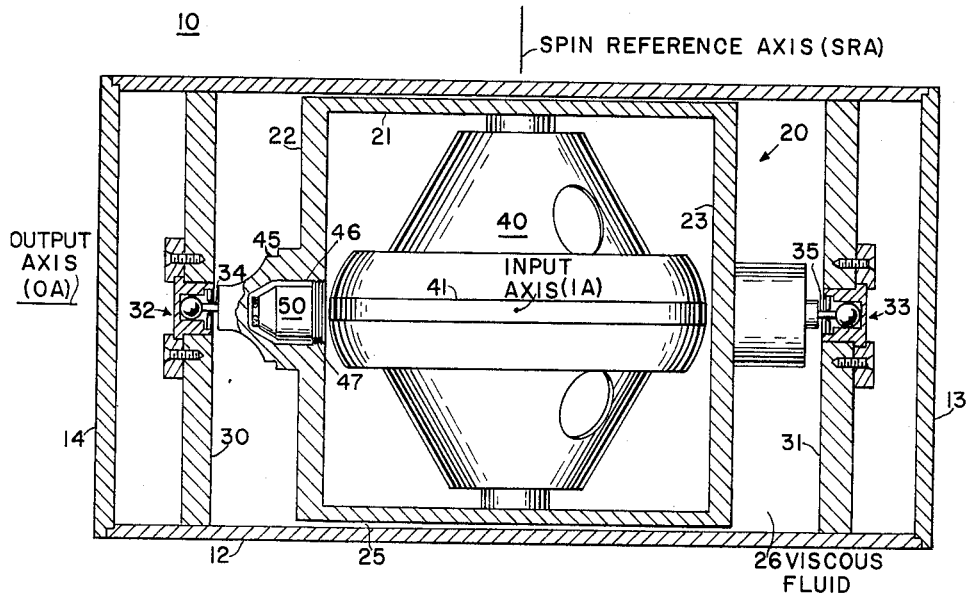
Fig. 1
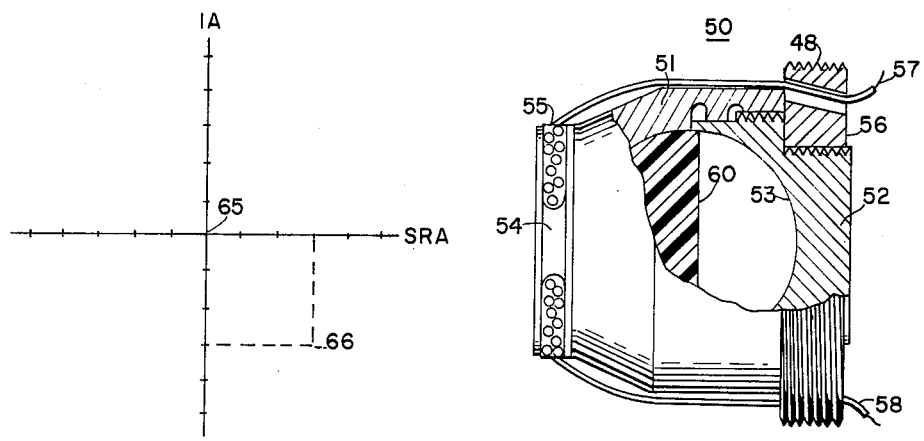
Fig. 3
Fig. 2
*INVENTOR.*
GLEN R. SPETZ
BY Roger W. Jensen

United States Patent Office 3,230,778
Patented Jan. 25, 1966

3,230,778
CONTROL APPARATUS
Glen R. Spetz, Pinellas County, Fla., assignor to
Honeywell Inc., a corporation of Delaware
Filed Dec. 28, 1959, Ser. No. 862,291
10 Claims. (Cl. 74—5)

The present invention pertains generally to control apparatus and more specifically to apparatus for adjusting the static balance of a rotatable element. The present invention has specific although not limited application to the field of floated instruments such as floated integrating gyroscopes and floated pendulous accelerometers. In a sensitive instrument such as a floated gyroscope, it is quite imperative during the manufacture of the unit to be able to balance to a very fine degree the gimbal element. For example, a requirement exists at the present time for typical floated instruments to have the gimbal element of the instrument balanced during manufacture so that there is no more than .05 dynecentimeters of unbalance.

Heretofore various arrangements have been proposed for adjusting the static balance of a sensitive instrument about a rotational axis. One of these previous arrangements is disclosed in Patent 2,859,626 which was granted to R. O. Maze on November 11, 1958. The present invention constitutes an improvement over this patent. Briefly the Maze patent discloses a pair of elongated capsules positioned on a gimbal with their longitudinal axes being at an angle to one another. The capsules contain thermoresponsive means and an object such as a ball element or bubble element having a different density from the thermoresponsive means. By applying heat to the capsules on a temporary basis, it is possible to allow the thermoresponsive means to shift relative to the objects and to thus obtain a shifting of the center of gravity of the entire capsule relative to the container.

The present invention is similar in some respects to said Maze Patent 2,859,626 but has several distinct advantages thereover. The present invention provides a single container adapted to be mounted in the gimbal or movable element of the sensitive instrument. The container of the present invention is characterized by having a spherically shaped hollow cavity within. The container may be mounted in different positions on the gimbal. Thermoresponsive means which in one embodiment may be a thermoplastic means are provided so as to fill up only a portion of the cavity of the container. The thermoresponsive means is normally bonded to the side of the cavity so as to maintain a fixed relationship with respect to the container. The present invention also provides means for temporarily rendering ineffective the bond of the thermoresponsive means to the container. Thus a single balancing element may be used to form the balancing function of the two capsules disclosed in the Maze patent. This permits a much more compact and lighter arrangement that is cheaper to manufacture and permits the balancing of a sensitive instrument to be done in far less time than the previous arrangement. Also the present arrangement has the advantage of requiring only one electrical circuit (vs. two circuits required in the Maze patent) which minimizes restraints on the gimbal. Also it has been found that the present invention provides a greater range of adjustment and has more accuracy or predictability than the previous arrangement.

It is an object of this invention therefore to provide an improved control apparatus.

Another object of the invention is to provide an improved apparatus for adjusting the static balance of a sensitive instrument about a rotational axis.

Other objects of the invention including constructional details of my invention will be set forth more fully in and become apparent from a reading of the following specification and appended claims, in conjunction with the accompanying drawing in which:

FIGURE 1 is a cross-sectional view of a floated gyroscope embodying the invention;

FIGURE 2 is a detailed cross-sectional view of a balancing container adapted to be used in the gyroscope of FIGURE 1; and FIGURE 3 is a graphical representation of the effect of relative movement between the container and the thermoresponsive means in the container on the static balance of the gimbal assembly of a sensitive instrument.

Referring to FIGURE 1 the reference numeral 10 generally depicts a sensitive instrument of the floated gyro type. The gyro is somewhat schematically represented as including a housing or case element 12 of general hollow cylindrical form closed off at its two ends by a pair of end caps 13 and 14. A gimbal assembly generally identified by reference numeral 20 is adapted to be positioned within the housing 12 and comprises a general hollow cylindrical member 21 closed off at its two ends as at 22 and 23. A narrow annular gap 25 is defined between the exterior of the gimbal member 21 and the inside of the housing enclosure 12. The gimbal is adapted to be supported in substantial neutral suspension in a suitable viscous fluid 26. The viscous fluid would completely surround the entire gimbal 20 including gap 25.

The gimbal is adapted to be mounted for limited rotation relative to the housing 12. This is somewhat schematically represented by a pair of intermediate support plates 30 and 31 which have centrally mounted therein a pair of jewel assemblies 32 and 33 respectively. The jewel assemblies 32 and 33 coact respectively with suitable pivots 34 and 35 at opposite ends of the gimbal assembly 20. The coacting jewels and pivots 32–34 and 33–35 therefore define an output axis (OA) of rotation of the gimbal assembly 20 relative to the housing 12.

A gyro spin motor is adapted to be positioned within the gimbal assembly 20. In FIGURE 1 the gyro spin motor is somewhat schematically shown and is generally identified by the reference numeral 40. It will be understood that the gyro 40 includes an inertia element 41 supported by suitable bearing means for rotation about a spin reference axis (SRA) which is substantially perpendicular to the output axis (OA). The gyro has an input axis (IA) which is that axis which intersects the output axis and the spin reference axis and which is perpendicular thereto.

The gimbal assembly end wall portion 22 is provided with a central hub portion 45 which projects outwardly from the main portion of the gimbal generally in an axial direction. The hub portion 45 of the gimbal has a symmetrically positioned recess or cavity 46 therein in communication with the hollow cavity or interior of the gimbal 21. The recess or cavity 46 is shaped so as to receive a balance capsule assembly 50 shown also in enlarged detail in FIGURE 2. The capsule assembly 50 is adapted to be secured in position within the recess 46 by any suitable means. The securing means shown include an internally threaded section 47 of the recess 46 which is adjacent to the end wall 22. The threaded section 47 is adapted to coact with a threaded section 48 on the balance capsule assembly. It will be noted that in this embodiment of the invention the recess 46 and the balancing element 50 positioned therein are generally symmetrical with respect to the output axis. However, it will be understood that the balance capsule need not be coincident with the rotational or output axis. The capsule can be mounted anywhere in the gimbal consistent with space requirements. Where required, the gimbal design is adjusted to balance the container weight.

Referring now to FIGURE 2 it will be noted that the balancing means 50 comprises an outside cover element 51 and an inside cover element 52. Generally the cover elements 51 and 52 are cuplike elements adapted to be nested together so as to define collectively a spherically shaped cavity 53 within. As shown the open end of inside cover element 52 is adapted to fit within a suitable recess portion of the open end of the outside cover element 51. Suitable means such as cooperating threaded portions on the cover elements 51 and 52 provide a method of securing the two elements together in assembled relationship. The cover elements 51 and 52 may be made out of any suitable heat transferring material, copper having been found very satisfactory. The outer cover element 51 is provided at one end thereof with a bobbin type arrangement 54 around which is wound a heating coil 55. A ferrule element 56 of any suitable insulative material such as cast epoxy resin has the form of an annular disc and is mounted on a reduced shoulder portion on the end of the inside cover element and is secured thereto by suitable means such as coacting threads. The element 56 serves as a header assembly for a pair of leads 57 and 58 connected to the coil means 55. The periphery of the ferrule element is threaded at 48. This permits the entire balance capsule 50 to be retained in position within the recess 46, the threaded sections 47 and 48 coacting for this purpose. The leads 57 and 58 thus provide a means of supplying energization of any suitable type to the coil means 55 for generating heat which in turn is conducted by the cover elements 51 and 52 to the cavity 53. With the type of joint between the cup elements 51 and 52 being as disclosed, it has been found that the heat from coil 55 is transmitted efficiently to all parts of the cavity 53.

A suitable condition responsive means in the form of a thermoresponsive means 60 is adapted to be placed within the cavity 53 so as to fill a portion of the cavity. Various materials may be used for the thermoresponsive means, one material that has been found quite satisfactory being a lead-bismuth eutectic alloy having a melting point of approximately 257° F. Other thermoresponsive means obviously may be used depending upon the application and general environment of the sensitive instrument. As depicted in FIGURE 2, the thermoresponsive means 60 fills substantially one half of the cavity 53. The exact quantity of thermoresponsive means placed in the cavity 53 is not critical as long as the mass thereof is known and as long as a certain amount of void space remains. As shown in FIGURE 2, the thermoresponsive means 60 is located essentially in that part of the spherical cavity 53 defined by outer cover element 51. It may also be located in that part of the cavity defined by inner cover member 52. Either one of these two positions results in the mass of the thermoresponsive means being symmetrically positioned with respect to the output axis (OA) and represents the desired locations for the thermoresponsive means 60 if the gimbal were in the desired state of static balance. One of the two stated positions of the thermoresponsive means would be used as a starting point prior to adjustment for correcting static unbalance. The characteristics of the thermoresponsive means are selected so that at the normal operating temperature of the instrument the thermoresponsive means 60 is bonded to the side of the container. Thus for the example given, the lead-bismuth alloy would be used in an instrument adapted to have an operating temperature somewhat below the level of 257° F. At this somewhat lower temperature the lead-bismuth alloy has a solid state. It may be in some cases desirable to insure the bonding of the thermoplastic means 60 to the container 50. To this end various techniques may be used such as for example the plating of a very thin coating of tin (not shown) on the wall or sides of the cavity 53. It is essential that when the thermoplastic or thermoresponsive means 60 is in its solid state (as opposed to its platsic state) that the material 60 be bonded firmly to the container 50 so as to have a fixed relationship with respect to the container.

Operation

In the manufacture of a sensitive instrument such as a floated gyroscope wherein it is essential that a rotatable element be statically balanced, the design of the rotatable element will inherently be such that static balance is quite closely accomplished. Then there is usually provided some relatively coarse balancing means such as adjustment screws (not shown) which can be adjusted so as to bring the static balance within a certain minimum range such as for example in the case of one floated gyroscope, ±10 dyne-centimeters. This coarse adjustment may be performed on the gimbal assembly 20 as a subassembly of the entire instrument 10. Upon complete assembly of the instrument 10, certain tests can be performed which will indicate the magnitude and sense of gimbal unbalance. For example, if the gimbal assembly 20 as shown in FIGURE 1 is statically unbalanced by a component of unbalance lying along the spin reference axis, this can be determined by various testing techniques one of which is to have the input axis of the gyroscope vertical and to measure (after making certain allowances for the earth's rotation) the amount of unbalance torque tending to rotate the gimbal assembly about the output axis. Such measuring means would include signal generating means and torque generating means adapted to coact with the gimbal assembly 20, such torque and signal generating means not being shown since they form no direct part of the present invention. Likewise, by having the spin reference axis vertical, any unbalance component lying along the input axis of the gimbal assembly 20 may be measured.

In FIGURE 3 the input axis (IA) and spin reference axis (SRA) are depicted and their intersection is identified by reference numeral 65. If the measurements made during the testing of the instrument reveal that the gimbal 20 is perfectly balanced from a static standpoint (with the thermoresponsive means being in the position as shown in FIGURE 2) then of course no further balancing is needed. However, as a practical matter, the usual finding during this testing is that there is a component of unbalance of one sense or another along the input axis as well as another component of unbalance along the spin reference axis. A hypothetical case would involve having three units of unbalance along both the input and spin reference axes. In FIGURE 3 a projected intersection of a three unit correction is shown for the spin reference and input axes, the intersection being designated by reference numeral 66. The heater means 55 is then energized from a suitable source of power through leads 57 and 58 so as to raise the temperature within the cavity 53 above the melting point of the thermoplastic or thermoresponsive means 60. While the thermoresponsive means 60 is in the plastic or fluid state, the gyro is rotated to an attitude where the output axis will be tilted away from a vertical attitude with equal amounts of tilting along the input axis and the spin reference axis and with the degree of tilt being sufficient to apply three units of correction along both the spin reference and input axes. It will be understood that the magnitude of the correction will be a function of the tilting of the gyroscope while the thermoresponsive means is in the plastic state. It will be further understood that the tilting of the gyroscope while the thermoresponsive means is in the plastic state will cause a relative shifting between the thermoresponsive means and the container from the original fixed relationship as shown in FIGURE 2 to any one of a plurality of relative angular positions depending upon the direction and magnitude of the tilt of the output axis away from the vertical. For the example given, equal amounts of correction along the input axis and spin reference axis were required. Another example would be where the only component of unbalance lies along the input axis. In this case the output axis and input axes would lie in a vertical plane and the output axis would be tilted in the plane away from the vertical to cause enough shifting between the thermoresponsive means 60 and the container 50 so as to provide the proper number of units of correction.

In practice after the gyro has been moved to the proper position, then the heating means 55 is deenergized so as to permit the container 50 to cool off and to allow the thermoresponsive means 60 to solidify and to be rebonded to the container 50 with the gyro maintained in the tilted position. At this point the static balance of the gimbal assembly 20 may be rechecked and if necessary further balancing may be done by going through the same procedure as described above. It will be understood that in some cases where very fine degrees of static balance are desired, it may be necessary to repeat the steps of measuring unbalance and shifting the thermoresponsive means 60 relative to the container 50 several times.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

What I claim is:

1. Apparatus of the class described comprising a sensitive instrument having a movable element supported for rotation about an axis; and means for adjusting the balance of said movable element about said axis comprising a container mounted on said movable element, said container being characterized by having a spherically shaped hollow cavity, thermoplastic means filling a portion of said cavity, said thermoplastic means normally being solidified and adhering to the side of said cavity so as to maintain a fixed relationship with respect to said container, and heating means for temporarily rendering said thermoplastic means plastic to permit a relative movement between said container and said thermoplastic means to any one of a plurality of relative angular positions, said heating means including a heating coil connected thermally to said container.

2. Apparatus of the class described comprising a sensitive instrument having a movable element supported by precision bearings for limited rotation about an axis; and means for adjusting the static balance of said movable element about said axis comprising a container mounted on said movable element in line with said axis, said container being characterized by having a spherically shaped hollow cavity, thermoplastic means filling a portion of said cavity, said thermoplastic means normally being solidified and adhering to the side of said cavity so as to maintain a fixed relationship with respect to said container, and heating means for temporarily rendering said thermoplastic means plastic to permit a relative movement between said container and said thermoplastic means to any one of a plurality of relative angular positions, said heating means including a heating coil connected thermally to said container.

3. In a floated gyroscope comprising a gimbal element supported for limited rotation about an output axis; and means for adjusting the static balance of said gimbal element about said output axis comprising a container mounted on said gimbal element, said container being characterized by having a spherically shaped hollow cavity, thermoresponsive means filling a portion of said cavity, said thermoresponsive means normally being bonded to said container so as to maintain a fixed relationship with respect to said container, and heating means for temporarily rendering ineffective the bond of said thermoresponsive means to said container to permit a relative movement between said container and said thermoresponsive means to any one of a plurality of relative angular positions.

4. Means for adjusting the static balance of a movable element supported for rotation about an axis comprising a container adapted to be mounted on said movable element, said container being characterized by having a spherically shaped hollow cavity, thermoresponsive means filling a portion of said cavity, said thermoresponsive means normally being bonded to said container so as to maintain a fixed relationship with respect to said container, and heating means for temporarily rendering ineffective the bond of said thermoresponsive means to said container to permit a relative movement between said container and said thermoresponsive means to any one of a plurality of relative angular positions, said heating means including a heating coil on said container.

5. Means for adjusting the static balance of a movable element supported for rotation about an axis comprising a container adapted to be mounted on said movable element, said container being characterized by having a spherically shaped hollow cavity, thermoresponsive means filling a portion of said cavity, said thermoresponsive means normally being bonded to said container so as to maintain a fixed relationship with respect to said container, and means for temporarily rendering ineffective the bond of said thermoresponsive means to said container to permit a relative movement between said container and said thermoresponsive means to any one of a plurality of relative angular positions.

6. Means for adjusting the static balance of a movable element supported for rotation about an axis comprising a container adapted to be mounted on said movable element, said container being characterized by having a spherically shaped hollow cavity; condition responsive means filling only a portion of said cavity, said condition responsive means normally being bonded to said container so as to maintain a fixed relationship with respect to said container; and means for temporarily rendering ineffective the bond of said condition responsive means to said container to permit a relative movement between said container and said condition responsive means to any one of a plurality of relative angular positions.

7. Apparatus of the class described comprising: a sensitive instrument having a movable element supported for rotation about an axis; a means for adjusting the static balance of said movable element about said axis comprising a container mounted on said movable element, said container being characterized by having a symmetrically shaped cavity, said cavity having a surface defined by the 360° rotation of a curved line about an axis joining the ends of said curved line; thermoresponsive means filling only a portion of said cavity, said thermoresponsive means normally being bonded to the surface of said cavity so as to maintain a fixed relationship with respect to said container, and heating means for temporarily rendering ineffective the bond of said thermoresponsive means to said surface to permit a relative movement between said container and said thermoresponsive means to any one of a plurality of relative angular positions.

8. In a sensitive instrument: a movable element supported for rotation about an axis; a means for adjusting the static balance of said movable element about said axis comprising a holder element mounted on said movable element, said holder element having a cavity therein, said cavity having a surface defined by the 180° rotation of a curved line about an axis joining the ends of said curved line; thermoresponsive means positioned within said cavity, said thermoresponsive means being normally rigid and maintaining a fixed relationship with respect to said holder element; and heating means for temporarily rendering said thermoresponsive means plastic and thereby permitting relative movement between said holder element and said thermoresponsive means.

9. In a sensitive instrument: a movable element supported for rotation about an axis; a means for adjusting the static balance of said movable element about said axis comprising a holder element mounted on said movable element, said holder element having a depression therein; thermoresponsive means positioned within said depression, said thermoresponsive means being normally rigid and maintaining a fixed relationship with respect to said holder element; and means contiguous said holder element adapted to temporarily render said thermoresponsive means plastic and thereby permit relative movement between said holder element and said thermoresponsive means.

10. In a sensitive instrument: a movable element supported for rotation about an axis; a means for adjusting the static balance of said movable element about said axis comprising a holder element mounted on said movable element, said holder element having a hole therein; thermoresponsive means positioned within said hole, said thermoresponsive means being normally rigid and maintaining a fixed relationship with respect to said holder element; and means contiguous said holder element for temporarily rendering said thermoresponsive means plastic and thereby permitting a relative movement between said holder element and said thermoresponsive means.

References Cited by the Examiner

UNITED STATES PATENTS

| 829,251 | 8/1906 | Booraem | 74—573 |
|---|---|---|---|
| 2,265,076 | 12/1941 | Larsen | 74—573 |
| 2,438,213 | 3/1948 | Hamilton | 74—5.44 |
| 2,722,848 | 11/1955 | Stein | 74—573 |
| 2,859,626 | 11/1958 | Maze | 74—5.7 |

FOREIGN PATENTS 679,522  9/1952  Great Britain.

BROUGHTON G. DURHAM, *Primary Examiner.*

SAMUEL SPINTMAN, *Examiner.*